United States Patent
Yeh

(10) Patent No.: US 7,428,231 B2
(45) Date of Patent: Sep. 23, 2008

(54) CHANNEL SHARING METHOD AND DEVICE THEREOF

(75) Inventor: Tainder Yeh, Miaoli County (TW)

(73) Assignee: Windbond Electronics Corp., Hsinchu (TW)

( * ) Notice: Subject to any disclaimer, the term of this patent is extended or adjusted under 35 U.S.C. 154(b) by 604 days.

(21) Appl. No.: 10/711,937

(22) Filed: Oct. 14, 2004

(65) Prior Publication Data

US 2006/0029030 A1  Feb. 9, 2006

(30) Foreign Application Priority Data

Aug. 5, 2004  (TW) .............................. 93123437 A

(51) Int. Cl.
*H04J 3/00* (2006.01)
*H04J 3/08* (2006.01)
*H04B 7/212* (2006.01)
*H04L 12/43* (2006.01)

(52) U.S. Cl. .................. 370/345; 370/326; 370/376; 370/442; 370/458

(58) Field of Classification Search ............... 370/345, 370/94.1, 95.3, 85.2–85.3, 326, 376, 442, 370/458, 459, 336, 468, 470, 498, 508; 455/103
See application file for complete search history.

(56) References Cited

U.S. PATENT DOCUMENTS 5,541,924 A *  7/1996  Tran et al. .................... 370/347

* cited by examiner

*Primary Examiner*—Matthew Anderson
*Assistant Examiner*—Eugene Yun
(74) *Attorney, Agent, or Firm*—Jianq Chyun IP Office

(57) ABSTRACT

A channel sharing method and device thereof are disclosed. The method starts by providing a plurality of channels, wherein each of the channels comprises a time interval. A time slot having a width being X times of a maximum value of all the time intervals is provided, wherein C is a positive number. Each of the channels is generated by a permutation of at least one repeat time, which is M times of the width of the time slot, wherein M is an integer larger than 0. A first time slot of the repeat time comprises a signal. A maximum time span of the signals in each channel is the time interval of each channel. All the channels are arranged so that at least one of the signals in each channel is not collided with the signals of other channels in a worst time delay.

14 Claims, 5 Drawing Sheets

CHANNEL SHARING METHOD AND DEVICE THEREOF

CROSS-REFERENCE TO RELATED APPLICATION

This application claims the priority benefit of Taiwan application serial no. 93123437, filed Aug. 5, 2004.

BACKGROUND OF THE INVENTION

1. Field of the Invention

The present invention relates to a channel sharing method and device thereof, and more particularly, to a channel sharing method that ensures at least one transmitted signal of each channel is valid in the worst delay time and a device thereof.

2. Description of the Related Art

With the advancement of electronic and communication technology, wireless communication has been applied in various electronic products to enhance user-friendliness. In different states and areas, different channel ranges are used to avoid signal transmission collisions. Accordingly, the frequency range of each state or country is restricted. Each state or country has its own standard of wireless transmission, for example, assigned in the Industry, Science and Medical (ISM) band. Each state or country has different range and standard of ISM bands. Moreover, the available channels are far fewer than required. Accordingly, methods and apparatus to expand the channel numbers are sought after.

Generally, for the two-way wireless transmission or wireless control, such as the data transmission between cellular phones and base stations, the base stations control the transmission and receiving of the channel signals of all the cellular phones. Therefore, a restricted channel bandwidth can be extended that all the users can access the service with the cellular phones.

For the one-way wireless transmission or wireless control, for example, the signal transmission between a remote-controlled car and a remote controller, the remote controller controls the channels. Thus, when several remote-controlled cars are simultaneously operated, the collisions among the channels will occur, and some cars cannot receive the control signals for a long period of time.

FIG. 1 is a schematic drawing showing a multi-channel transmission of a conventional one-way wireless control. As shown in FIG. 1, channel 1 transmits signals 102, 104 and 106, the channel 2 transmits signals 112, 114, 116 and 118, and the channel 3 transmits signals 122, 124 and 126. The signal 102 collides with signals 112 and 122, and the signal 106 collides with signals 118 and 126, so that only signal 104 can be received by the receiver of channel 1. Likewise, for channel 2, only signal 116 can be received. For channel 3, no signal can be received.

In order to resolve the above issue in the one-way wireless control, one conventional method is to generate signals in each channel randomly. However, the time delay of each transmission between emitting and receiving of the signals cannot be estimated. Specially, when the channel number is increased, some channels are not able to receive signals for a long period of time.

SUMMARY OF THE INVENTION

Accordingly, the present invention is directed to a channel sharing method, wherein it is ensured that in a worst delay time, at least one of the transmitted signal of each channel is valid. In addition, the worst delay time can be pre-estimated.

The present invention is also directed to a channel sharing device, wherein it is ensured that in a worst delay time, at least one transmitted signal of each channel is valid. In addition, the worst delay time can be pre-estimated.

The present invention discloses a channel sharing method, which comprises the following steps. The method starts by providing a plurality of channels, wherein each of the channels comprises a time interval of signal transmission. A time slot is provided, wherein a width of the time slot is X times of a maximum value of all the time intervals, wherein X is a positive number. Each of the channels is constructed by a permutation of at least one repeat time, wherein the repeat time is M times of the width of the time slot, wherein M is an integer larger than 0, and a first time slot of the repeat time comprises a signal. A maximum time span of the signals in each channel is the time interval of the channel. The channels are arranged so that at least one of the signals in each of the channels is not collided with the signals of the other channels in a worst time delay.

In an embodiment of the present invention, the width of the slot is twice of the maximum value of all the time intervals.

In an embodiment of the present invention, at least one of the channels comprises two repeat times with different lengths.

In an embodiment of the present invention, the step of arranging the channels comprises checking a preset table or a computation by a program or a software.

The present invention also discloses a channel sharing device, which comprises a plurality of transmission devices and receiving devices. Each of the transmission devices comprises a transmitter and an encoder. The encoder generates a channel with a signal and a wireless signal is transmitted by a transmitter. Each of the receiving devices comprises a receiver and a decoder. Wherein, the receiver receives the wireless signal which is decoded by the decoder to obtain the signal. Each channel comprises a time interval and a time slot, wherein a width of the time slot is X times of a maximum value of the time intervals of the channels, and X is a positive number. Each of the channels is generated by a permutation of at least one repeat time. The repeat time is M times of the width of the time slot, wherein M is an integer larger than 0. A first time slot of the repeat time comprises the signal. A maximum time span of the signals in each of the channel is the time interval of each of the channels. All the channels are arranged so that at least one of the signals in each of the channels is not collided with the signals of the other channels in a worst time delay.

In an embodiment of the present invention, each of the transmission devices corresponds to one or more receiving devices.

In an embodiment of the present invention, the encoder comprises a first clock generator and first channel generator. Wherein, the first clock generator generates a clock signal, and the first channel generator generates the channel comprising the signal.

In an embodiment of the present invention, the first channel generator comprises a preset table, a program or a software.

In an embodiment of the present invention, the decoder comprises a second clock generator and a second channel generator. Wherein, the second clock generator generates a clock signal, and the second channel generator decodes the wireless signal to obtain the signal.

In an embodiment of the present invention, the second channel generator comprises a preset table, a program or a software.

In an embodiment of the present invention, the width of the slot is twice of the maximum value of all the time intervals.

In an embodiment of the present invention, at least one of the channels comprises two repeat times with different lengths.

In an embodiment of the present invention, the transmitter or the receiver comprises a radio frequency (RF) generator and an antenna.

Accordingly, the present invention sets the time interval and the width of the time slot, and properly selects the repeat time for each channel. In the worst delay time, at least one signal of each channel will not collide with signals of the other channels. That is, in the worst delay time, at least one transmitted signal of each channel is valid. In addition, the worst delay time can be pre-estimated in the present invention.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

DESCRIPTION OF THE EMBODIMENTS

Figure 1:
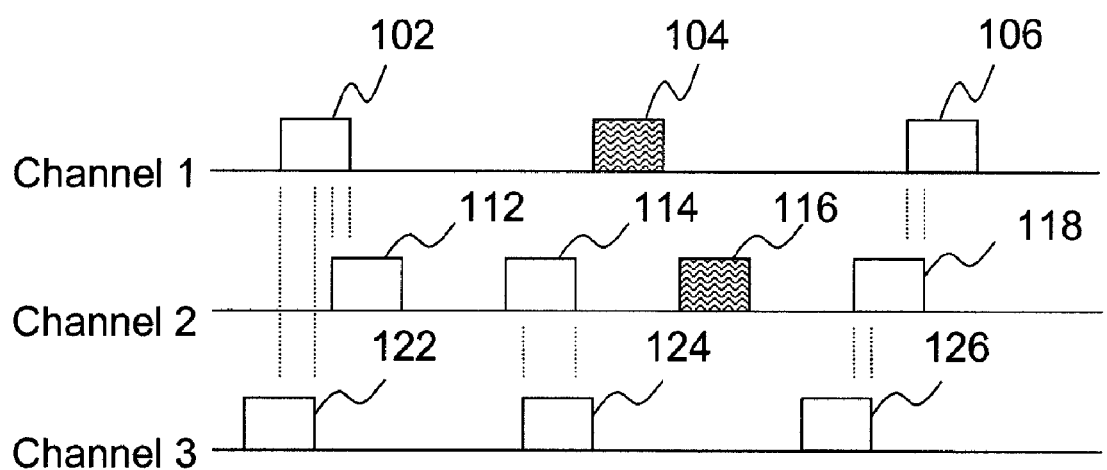
FIG. 1 is a schematic drawing showing a multi-channel transmission of a conventional one-way wireless control.
Figure 2A:
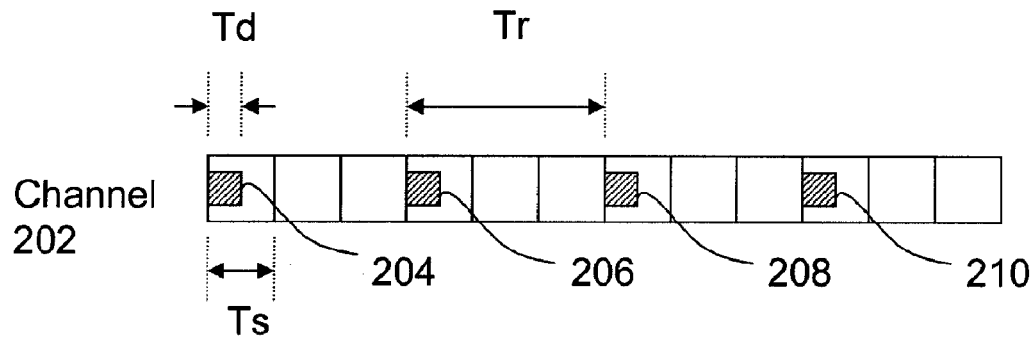
FIGS. 2A-2C are schematic configurations showing channels according to an embodiment of the present invention.
Figure 2B:
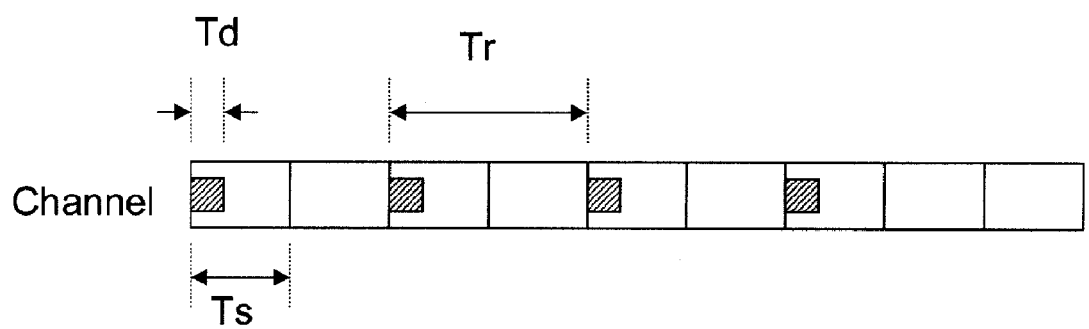
Figure 2C:
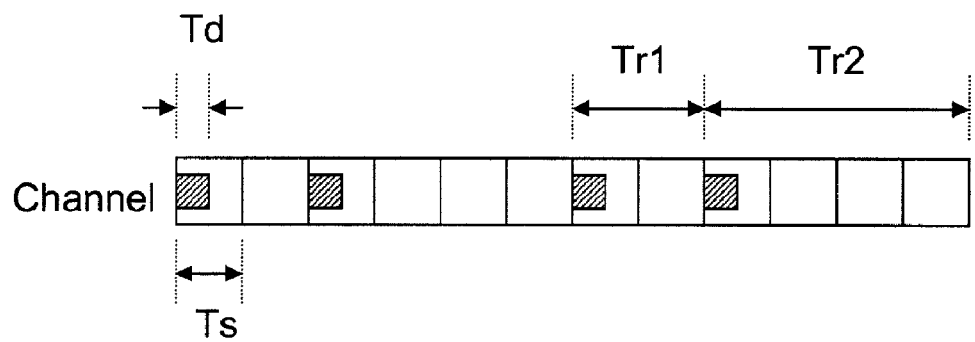

FIGS. 2A-2C are schematic views showing channels according to an embodiment of the present invention. With reference to FIG. 2A, the channel 202 of the present invention comprises the transmitted signals 204, 206, 208 and 210, wherein a time interval Td is a maximum value of all the time intervals of the signals 204, 206, 208, 210 and so on. In an embodiment of the present invention, a time slot Ts is provided, wherein the width of the time slot is X times of the time interval Td, and X is a positive number. For example, Ts=2*Td in FIG. 2A, and Ts=3*Td in FIG. 2B. The channel 202 is generated by a permutation of at least one repeat time Tr, wherein the repeat time Tr is M times of the width of the time slot Ts, and M is an integer larger than 0. For example, Tr=3*Ts in FIG. 2A, and Tr=2*Ts in FIG. 2B. In addition, the transmitted signal is in the first time slot Ts of each repeat time Tr. In another embodiment of the present invention, the transmitted signal may be constructed in any one of the time slots of the repeat time Tr.

In this embodiment of the present invention, each channel may be generated by a permutation of a repeat times Tr repeatedly as shown in FIGS. 2A and 2B. In some embodiments, each channel may also be generated by a permutation of at least two different repeat times, such as the serial repeat times Tr1=2*Ts and Tr2=4*Ts, as shown in FIG. 2C.

Figure 3:
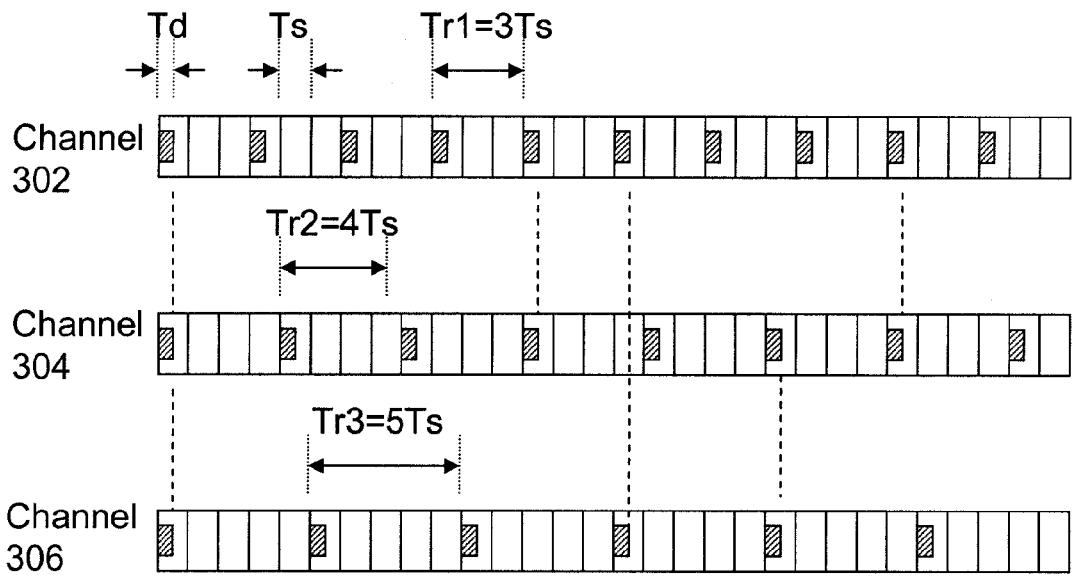
FIG. 3 is a schematic drawing showing a channel sharing method according to an embodiment of the present invention.

What follows is the description of a channel sharing method according to an embodiment of the present invention. FIG. 3 is a schematic drawing showing a channel sharing method according to an embodiment of the present invention. Please refer to FIG. 3, a channel sharing method for three channels 302, 304 and 306 is to be discovered. The time interval Td is generated according to a maximum value of all the time intervals of the signals in channels 302, 304 and 306. The channels 302, 304 and 306 are coordinated to have the same time interval Td and the same time slot Ts. In this embodiment, the width of the time slot Ts can be twice of the time interval Td. In some embodiments of the present invention, the width of the time slot Ts can be X times of the time interval Td, wherein X is a positive number.

Three coprime numbers, such as 3, 4 and 5, are used to set the first repeat times of the three channels respectively. For example, the repeat time of channel 302 is Tr1=3Ts; the repeat time of channel 304 is Tr2=4Ts; and the repeat time of channel 306 is Tr3=5Ts. It is understood that channel 306 has the longest repeat time Tr3=5Ts. Accordingly, in the same time period, channel 306 transmits the fewest signals. Besides, except for the first time slot, channel 306 collides with channel 302 at the $16^{th}$ (i.e., 5*3+1) time slot. The channel 306 collides with channel 304 at the $21^{st}$ (i.e., 5*4+1) time slot. Therefore, channel 306 only transmits two signals after the first time slot, then two signal collisions occur, resulting in transmission failure. Accordingly, FIG. 3 is not a proper embodiment for the present invention.

Figure 4:
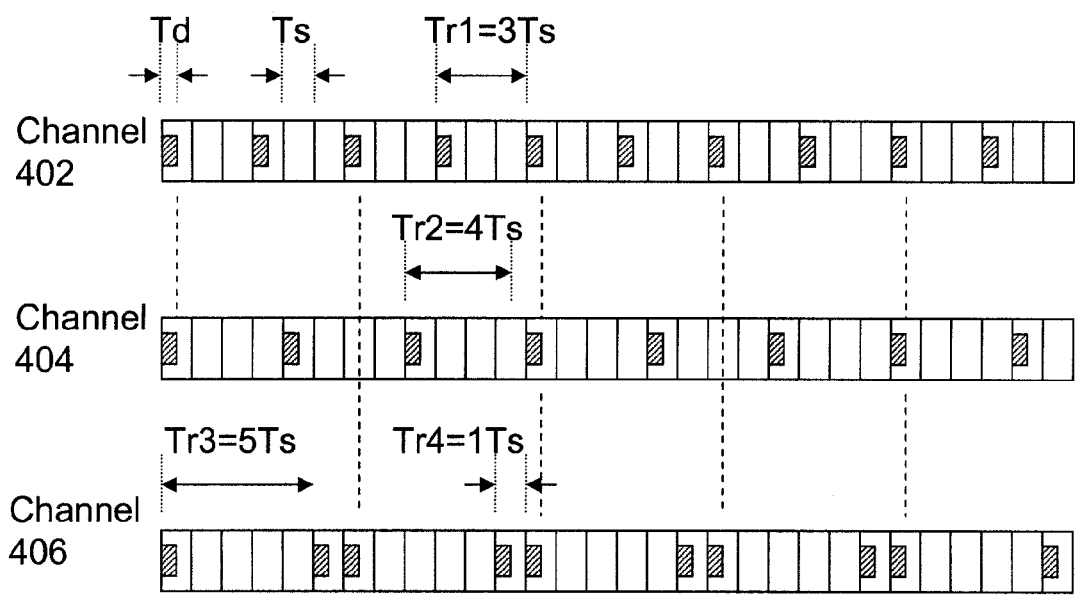
FIG. 4 is a schematic configuration showing a channel sharing method according to an embodiment of the present invention.

FIG. 4 is a schematic configuration showing a channel sharing method according to an embodiment of the present invention. With reference to FIG. 4, the repeat times for the channels 402 and 404 are Tr1=3Ts and Tr2=4Ts, respectively. In order to resolve the above problem that the channel 306 has the maximum repeat time of all the channels 302 and 304, channel 406 is generated by two repeat times Tr3=5Ts and Tr4, wherein assuming that Tr4=1Ts in the first instance.

The effective repeat time effTr represents the collection of the sum of all the repeat times. For the channel with one repeat time Tr, the effective repeat time effTr can be shown as:

$$\{effTr\}=\{Tr, 2Tr, 3Tr, 4Tr, \ldots\}$$

For the channel with two repeat times Tr1 and Tr2, the effective repeat time effTr can be shown as:

$$\{effTr\}=\{Tr1, Tr2, (Tr1+Tr2)=Tu1, (Tu1+Tr1), (Tu1+Tr2), (Tu1+Tu1)=2Tu1, \ldots\}$$

Likewise, for the channel with three repeat times Tr1, Tr2 and Tr3, the effective repeat time efftr can be shown as:

$$\{effTr\}=\{Tr1, Tr2, Tr3, (Tr1+Tr2), (Tr2+Tr3), (Tr3+Tr1), (Tr1+Tr2+Tr3)=Tu1, (Tu1+Tr1), (Tu1+Tr2), (Tu1+Tr3), (Tu1+Tr1+Tr2), (Tu1+Tr2+Tr3), (Tu1+Tr3+Tr1), \ldots\}$$

For channels with more than three repeat times, the effective repeat time can be deduced from the formulae described above. Detailed descriptions are spared herein. Basically, the number of effective repeat time can be infinite.

With reference to FIG. 4, the effective repeat time of channel 402 is $\{3, 6, 9, 12, 15, 18, \ldots\}$ Ts according to the above formulae; the effective repeat time of channel 404 is $\{4, 8, 12, 16, 20, \ldots\}$Ts; and the effective repeat time of channel 406 is:

$$\{effTr\} = \{1, 5, (1+5) = 6, (6+1) = 7, (6+5) = 11, (6+6) = 12, \ldots\}Ts$$
$$= \{1, 5, 6, 7, 11, 12, \ldots\}Ts$$

Accordingly, the effective repeat time of channel 402 is {3, 6, 9, 12, ...}Ts; the effective repeat time of channel 404 is {4, 8, 12, 16, ...}Ts; and the effective repeat time of channel 406 is {1, 5, 6, 7, 11, 12, ...}Ts.

For the purpose of channel sharing, in the three channels, channel 404 has the single maximum repeat time Tr2=4Ts. Since (3−1)*Tr2=8Ts, accordingly, only the repeat times which are smaller than 8Ts of the three channels are considered and compared. By comparing the repeat time {3, 6, ...}Ts of channel 402, the repeat time {4, 8, ...}Ts of channel 404, and the repeat time {1, 5, 6, 7, ...}Ts of channel 406, it is noted that channel 402 collides with channel 406 at the repeat time 6Ts. Accordingly, the assumption that the second repeat time Tr4 of the channel 406 is equal to 1Ts is not appropriate.

With reference to FIG. 4, except for the first time slot Ts, channel 402 collides with channel 406 at the 7th, 13th, 19th and 24th time slots. For channel 406, after the first time slot, one of two signal transmissions fails. Accordingly, FIG. 4 is not a proper embodiment of the present invention.

Figure 5:
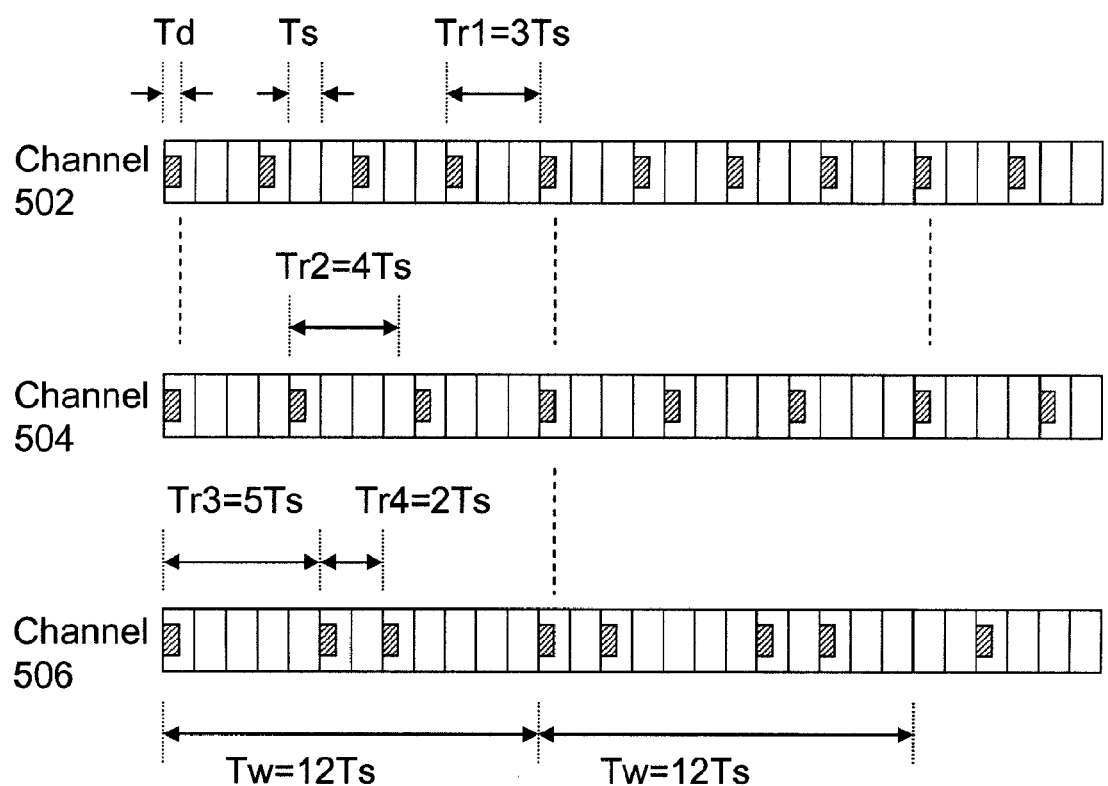
FIG. 5 is a schematic configuration showing a channel sharing method according to an embodiment of the present invention.

FIG. 5 is a schematic configuration showing a channel sharing method according to an embodiment of the present invention. With reference to FIG. 5, the repeat times of channels 502 and 504 are Tr1=3Ts and Tr2=4Ts, respectively. The channel 406 is generated by two repeat times Tr3=5Ts and Tr4, assuming that Tr4=2Ts in the instance.

With reference to FIG. 5, the effective repeat time of channel 502 is {3, 6, 9, 12, 15, 18, ...}Ts; the effective repeat time of channel 504 is {4, 8, 12, 16, 20, ...}Ts; and the effective repeat time of channel 506 is:

$$\{effTr\} = \{2, 5, (2+5) = 7, (7+2) = 9, (7+5) = 12, (7+7) = 14, \ldots\}Ts$$
$$= \{2, 5, 7, 9, 12, 14, \ldots\}Ts$$

For the purpose of channel sharing, in the three channels, channel 504 has the single maximum repeat time Tr2=4Ts. Since (3−1)*Tr2=8Ts, accordingly, only the repeat times which are smaller than 8Ts of the three channels are considered and compared. By comparing the repeat time {3, 6, ...}Ts of channel 502, the repeat time {4, 8, ...}Ts of channel 504, and the repeat time {2, 5, 7, ...}Ts of channel 506, no collisions occur among the three channels in the time period 8Ts. Accordingly, the assumption that the second repeat time Tr4 is equal to 2Ts is appropriate.

By comparing the repeat time {3, 6, 9, 12, 15, 18, 21, 24, 27, 30, ...}Ts of channel 502, the repeat time {4, 8, 12, 16, 20, 24, 28, 32, ...}Ts of channel 504, and the repeat time {2, 5, 7, 9, 12, 14, 16, 19, 21, 23, 26, 30, ...}Ts of channel 506, the channels 502, 504 and 506 collide at the time slot 12Ts. As shown in FIG. 5, except for the first time slot, the channels 502, 504 and 506 collide at the 13th time slot. The channels 502 and 504 collide at the 25th time slot. Accordingly, the worst delay time Tw is 12Ts in the channel sharing method shown in FIG. 5. In the worst delay time Tw, the channels 502, 504 and 506 have three, two and three valid signal transmissions, respectively. Accordingly, this embodiment shown in FIG. 5 is better than the embodiments shown in FIGS. 3 and 4.

According to an embodiment of the present invention, the channel sharing method described above comprises a preset table according to the number of the sharing channels. Alternatively, the sharing channel method can be edited as a program or a software stored in memory media, such as memories, disks or floppies to be shared by other processing systems.

In an embodiment of the present invention, all channels have the same time interval and same width of the time slot. The width of the time slot is X times of the time interval Td, wherein X is a positive number. Each of the channels has at least one repeat time having M times of the width of the time slot, wherein M is an integer larger than 0. Any modification described above all falls within the scope of the present invention.

Figure 6:
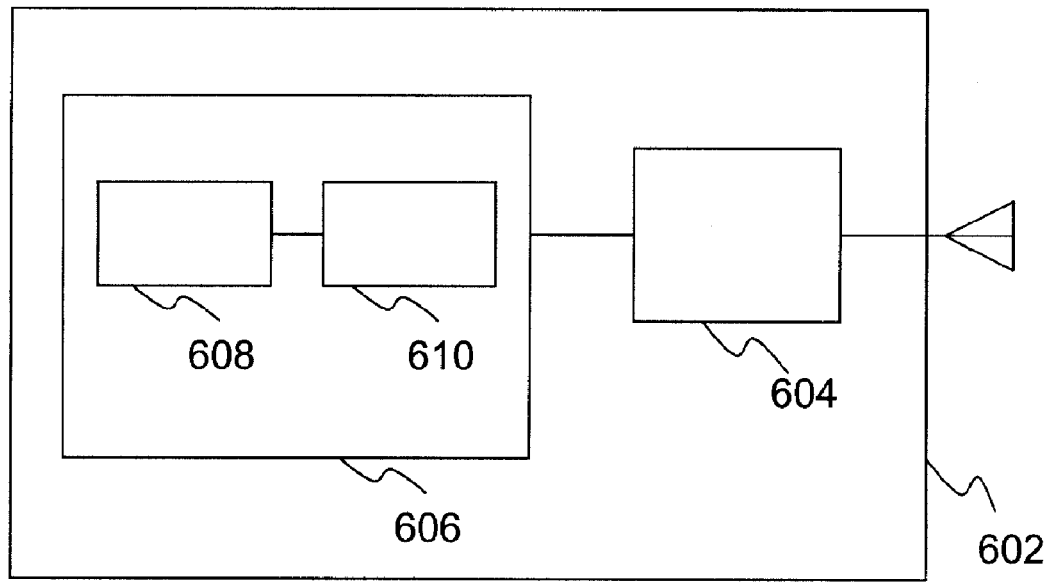
FIG. 6 is a schematic configuration showing a channel sharing device according to an embodiment of the present invention.
Figure 6:
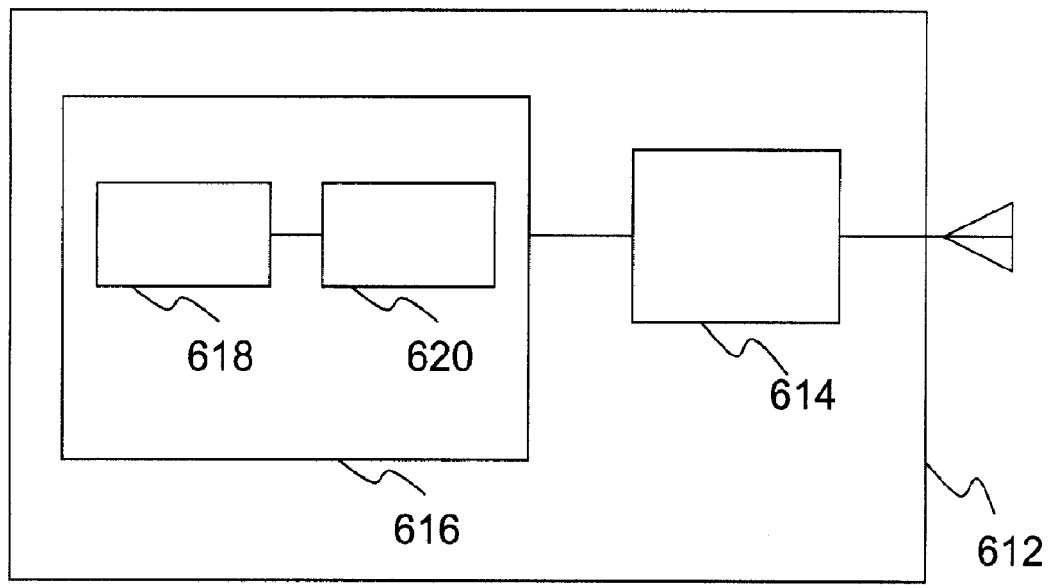

What follows is the descriptions of a channel sharing device according to one embodiment of the present invention. FIG. 6 is a schematic drawing showing a channel sharing device according to an embodiment of the present invention. Please refer to FIG. 6. The channel sharing device 600 comprises a plurality of transmission devices 602 and receiving devices 612. Wherein, each of the transmission devices 602 may correspond to one or more receiving devices 612. The transmission device 602 comprises, for example, a transmitter 604 and an encoder 606. The encoder 606 comprises a clock generating device 608 and a channel generating device 610. The receiving device 612 comprises, for example, a receiver 614 and a decoder 616. The decoder 616 comprises a clock generating device 618 and a channel generating device 620.

In an embodiment of the present invention, the channel generating devices 618 and 620 may comprise the preset table provided by the channel sharing method in the present invention, or the program or the software for generating a channel. The transmitter 604 and the receiver 614 may comprise, for example, a radio frequency (RF) generator and an antenna.

In an embodiment of the present invention, in the transmission device 602, the clock generator 608 generates a clock signal, and through the channel generator 610, the channel with the signal is generated, and the wireless signal is transmitted by the transmitter 604. In the receiving device 612, the receiver 614 receives the wireless signal. The clock generator 618 generate a clock signal, and through the channel generator 620, the wireless signal is decoded to obtain the signal in the channel.

To sum up, in the present invention, by setting the time interval and the width of the time slot, and selecting the repeat time(s) of each channel, at least one signal of each channel will not collide with signals of the other channels in the worst delay time. It means that, in the worst delay time, at least one transmitted signal of each channel is valid. In addition, the worst delay time can be pre-estimated in the present invention.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A channel sharing method, comprising:
providing a plurality of channels, wherein each of the channels comprises a time interval of signal transmission;
providing a time slot, wherein a width of the time slot is X times of a maximum value of all the time intervals, and X is a positive number equal or larger than 2; each of the channels is generated by a permutation of at least one repeat time, and the repeat time is M times of the width of the time slot, wherein M is an integer larger than 1, and a first time slot of the repeat time comprises a signal, and a maximum time span of the signals in each of the channels is the time interval of each of the channels; and
arranging all the channels so that at least one of the signals in each of the channels is not collided with the signals of the other channels in a worst time delay.

2. The channel sharing method of claim 1, wherein the width of the slot is twice of the maximum value of all the time intervals.

3. The channel sharing method of claim 1, wherein at least one of the channels comprises two repeat times with different lengths.

4. The channel sharing method of claim 1, wherein the step of arranging the channels comprises checking a preset table.

5. The channel sharing method of claim 1, wherein the step of arranging the channels comprises a computation by a program or a software.

6. A channel sharing device, comprising:
a plurality of transmission devices, wherein each of the transmission devices comprises a transmitter and an encoder, wherein the encoder generates a channel with a signal, and the transmitter transmits a wireless signal; and
a plurality of receiving devices, wherein each of the receiving devices comprises a receiver and a decoder, wherein the receiver receives the wireless signal, the decoder decodes the wireless signal to obtain the signal, wherein each of the channels comprises:
a time interval and a time slot, wherein a width of the time slot is X times of a maximum value of the time intervals of the channels, and X is a positive number equal or larger than 2; each of the channels is generated by a permutation of at least one repeat time, and the repeat time is M times of the width of the time slot, wherein M is an integer larger than 1 and a first time slot of the repeat time comprises the signal, and a maximum time span of the signals in each of the channel is the time interval of each of the channels; all the channels are arranged so that at least one of the signals in each of the channels is not collided with the signals of the other channels in a worst time delay.

7. The channel sharing device of claim 6, wherein each of the transmission devices corresponds to at least one of the receiving devices.

8. The channel sharing device of claim 6, wherein the encoder comprises a first clock generator and first channel generator, wherein the first clock generator generates a clock signal, and the first channel generator generates the channel comprising the signal.

9. The channel sharing device of claim 8, wherein the first channel generator comprises a preset table, a program or a software.

10. The channel sharing device of claim 6, wherein the decoder comprises a second clock generator and a second channel generator, wherein the second clock generator generates a clock signal, and the second channel generator decodes the wireless signal to obtain the signal.

11. The channel sharing device of claim 10, wherein the second channel generator comprises a preset table, a program or a software.

12. The channel sharing device of claim 6, wherein the width of the slot is twice of the maximum value of all the time intervals.

13. The channel sharing device of claim 6, wherein at least one of the channels comprises two repeat times with different lengths.

14. The channel sharing device of claim 6, wherein the transmitter or the receiver comprises a radio frequency (RF) generator and an antenna.

* * * * *